UNITED STATES PATENT OFFICE.

ROBERT W. DAVIS, OF ELMIRA, NEW YORK, ASSIGNOR TO THE CARBONATE MINING COMPANY, OF SAME PLACE.

MIXED PAINT.

SPECIFICATION forming part of Letters Patent No. 324,236, dated August 11, 1885.

Application filed July 21, 1884. (No specimens.)

*To all whom it may concern:*

Be it known that I, ROBERT W. DAVIS, of Elmira, in the county of Chemung, in the State of New York, have invented new and useful Improvements in Paints, of which the following is a full, clear, and exact description.

It is within the knowledge of the majority of householders that the better grades of paint now in use are very expensive, and also that those in which white lead is used, owing to the large quantity of acid which is employed in the manufacture of the white lead, are liable to "chalk off," for the reason that the acid eats or destroys the oil used in the composition of the paint.

The object of my invention is to cheapen the cost of paint, and at the same time to improve its quality by overcoming the aforesaid chalking off, and also to prevent all cracking by making the paint more elastic.

It further consists in making a paint that is more durable than the paints in ordinary use, and one in which, owing to the same specific gravity of the ingredients, the same will remain in solution and the oil be kept from rising to the top, as in ordinary paints, and thereby obviate the constant stirring of the paint while in use, which is annoying to the painter.

To this end my invention consists in using as a foundation or principal ingredient an article known as "shell-marl."

In the manufacture of my improved paint the marl, after it is derived from its natural bed, is thoroughly dried and then ground in oil, by any suitable grinding mechanism, to the consistence of a thin paste. To the mass thus formed is added any suitable oil in a sufficient quantity to render the said mass fluent, or of the consistence of other well-prepared paints, which are easily spread with the brush.

Prior to my present invention I have compounded the aforesaid ingredients with only such amount of oil as to produce a paste or plastic substance to be used in lieu of the ordinary putty; but by practical experiments and thorough tests I have since discovered that by careful treatment of the compound in the proportions of the same I am enabled to produce at a greatly reduced cost a paint in every respect superior to the ordinary white-lead paints.

This composition makes a dark-drab paint; but by adding to the marl and oil the quantity of oxide of zinc hereinafter specified the dark-drab color is lightened until it becomes almost a pure white.

In the place of the zinc I sometimes use white lead; but for the reason hereinbefore stated I prefer to entirely dispense with its use.

When marl and oil alone are used, about three hundred pounds of marl and twenty-two gallons of oil are combined to make thirty-five gallons of paint.

When zinc is added to the marl and oil, the same quantity of oil is used for a like quantity of paint; but the amount of marl is reduced to two hundred pounds and one hundred pounds of oxide of zinc are added to the oil and marl.

When white lead is substituted for the zinc, a less quantity of oil—say eighteen gallons of oil—is used with two hundred pounds of marl and one hundred pounds of white lead. In this case the quantity of paint produced will be somewhat less than thirty-five gallons.

The various ingredients, in the proportions above stated, are put into a mixing-mill, and after being thoroughly mixed they are ground in the ordinary paint-mill, coming therefrom in the form of a liquid. Any suitable coloring-matter to give the paint the desired shade may then be added.

The paint thus made I have found in the course of many and severe tests to be superior to the paints now in general use, and that it can be manufactured at a greatly-reduced cost.

Having thus fully described my invention, what I claim as new, and desire to secure by Letters Patent, is—

A paint composed of shell-marl, oil, and oxide of zinc, combined substantially as set forth.

In testimony whereof I have hereunto signed my name and affixed my seal, in the presence of two attesting witnesses, at Elmira, in the county of Chemung, in the State of New York, this 18th day of July, 1884.

ROBERT W. DAVIS. [L. S.]

Witnesses:
C. H. DUELL,
RALPH W. MORRISON.